Feb. 10, 1953 J. B. BAKER 2,628,072
DRILL BIT HAVING GROOVE WITH HARD METAL
CUTTER INSERT BRAZED THEREIN
Filed Sept. 1, 1949

INVENTOR:
John B. Baker,
by Carr & Carr & Gravely,
HIS ATTORNEYS.

Patented Feb. 10, 1953

2,628,072

UNITED STATES PATENT OFFICE 2,628,072

DRILL BIT HAVING GROOVE WITH HARD METAL CUTTER INSERT BRAZED THEREIN

John B. Baker, Canton, Ohio, assignor to The Timken Roller Bearing Company, Canton, Ohio, a corporation of Ohio Application September 1, 1949, Serial No. 113,539

3 Claims. (Cl. 255—64)

1

This invention relates to drill bits of the kind having hard metal cutter inserts brazed within radial grooves provided therefor in the working end of said bit. Heretofore the insert and groove therefor have been formed with parallel side faces and the insert made of less width than the groove so as to provide spaces for the brazing material between said side faces of said insert and groove. This manner of brazing the cutter insert in the groove is satisfactory so long as clearance spaces are maintained on both sides of the insert and groove during the brazing operation. In actual practice, however, the cutter insert is liable to shift sidewise in the groove during the brazing operation, thereby materially reducing or entirely eliminating the space between the insert and groove at one side thereof and thus preventing entry of a sufficient quantity of brazing material to provide an adequate bond between the insert and groove at said side thereof.

The object of the present invention is to assure the maintenance of spaces for the brazing material on both sides of the cutter insert and groove sufficient to accommodate enough brazing material to provide an adequate bond between both sides of said insert and groove even if the insert shifts sidewise during the brazing operation. The invention consists in so shaping the sides of one of said insert and groove that substantial spaces for bonding material are left on both sides of the insert even after maximum possible lateral shifting of the insert in said groove. More specifically, the invention consists in providing one of said insert and grooves with oblique or slanting sides so that substantially V-shaped spaces for bonding material are left on both sides of the insert after such lateral shifting of said insert in said groove. The invention also consists in the drill bit and in the parts and combination of parts hereinafter described and claimed.

Figure 1:
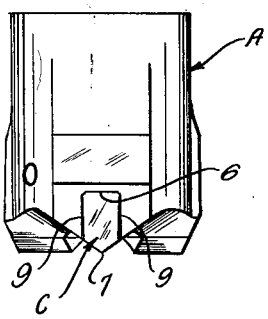
Figure 3:
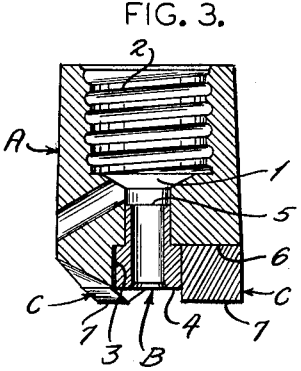
Figure 2:
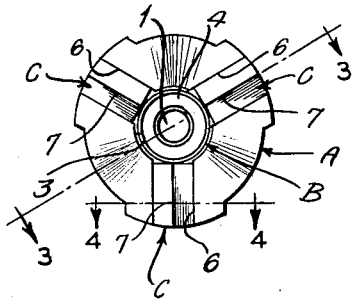
Figure 5:
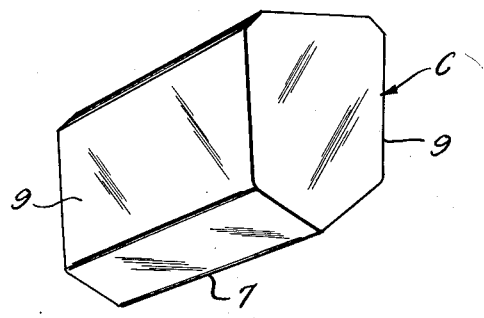
Figure 4:
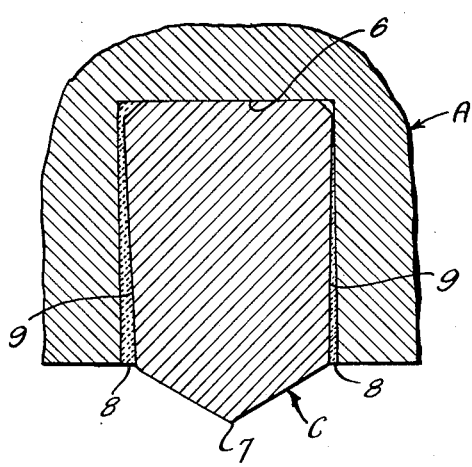
Figure 6:
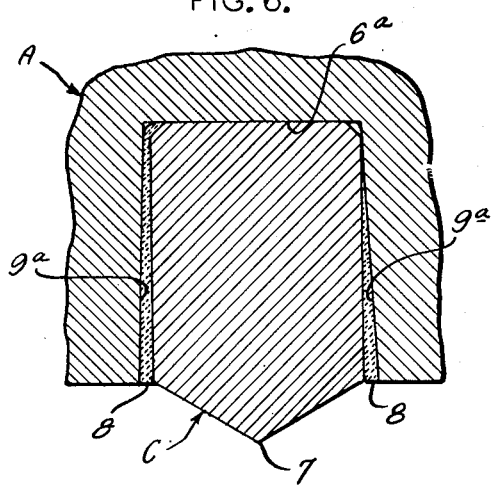

In the accompanying drawing, which forms part of this specification and wherein like symbols refer to like parts wherever they occur, Fig. 1 is a side elevational view of a hard metal cutter insert bit embodying my invention, Fig. 2 is an end elevational view of the cutting end of said bit, Fig. 3 is a central longitudinal sectional view of said bit on the line 3—3 in Fig. 2, Fig. 4 is an enlarged fragmentary sectional view on the line 4—4 in Fig. 2, Fig. 5 is a perspective view of one of the hard metal cutter inserts; and Fig. 6 is a view similar to Fig. 4 illustrating a modified form of the invention.

2

The accompanying drawing illustrates a drill bit comprising a body A having an axial bore 1 extending therethrough which is enlarged and threaded, as at 2, at one end to receive a drill rod (not shown). At the opposite or cutting end of the bit body A, the axial bore 1 thereof is counterbored, as at 3, to receive the head 4 of a tubular backing plug B having a stem 5 which fits in said bore inwardly of said counterbore and is brazed or otherwise secured therein.

The working end of the bit body A has a plurality of parallel-sided, flat-bottomed grooves 6 formed therein that extend radially thereof from the counterbored outer end 3 of the axial bore 1 of said bit body to the outer periphery thereof. Mounted in each of the radial grooves 6 in the outer or working end of the bit body A is an elongated cutter insert C of carbide or other hard metal which extends from end to end of said groove with its inner end in abutting relation to the head 4 of the plug B and with its outer end flush with the outer periphery of the bit body and is provided with an exposed beveled longitudinal cutting edge 7. The hard metal cutter insert C is of less width than the groove 6 so as to provide spaces for suitable brazing or other bonding material 8 on both sides of said insert in the central position thereof in said groove.

As shown in Figs. 4 and 5, the hard metal insert C has oblique or slanting sides 9 that converge towards one another from the bottom of said insert toward its beveled cutting edge 7. Thus, the cutter insert C tapers in width from the bottom to the top of the parallel-sided groove 6 in which it is mounted, whereby substantial V-shaped spaces for the brazing material 8 are left on both sides of the insert even if the insert shifts sidewise during the brazing operation into contact with one side of said groove and these V-shaped spaces are adapted to accommodate a thickness of brazing material sufficient to provide an adequate bond between both sides of said insert and groove.

While it is preferable to taper the hard metal insert C to insure proper bonding thereof in the groove 6 of the bit body A, a somewhat similar result may be obtained, as shown in Fig. 6, with a parallel-sided insert C' and a groove 6ª having flaring sides 9ª, thereby leaving substantial V-shaped spaces for brazing material 8 on both sides of the parallel-sided insert even after maximum possible lateral shifting thereof in the flared groove.

What I claim is:

1. In a drill bit, a body providing a groove opening axially of the body and having a bottom surface and two opposite sides, an insert for the bit formed of harder material than said body disposed in said body groove between said two opposite sides and against the bottom surface thereof, the sides of said insert and the adjacent sides of said groove forming spaces which vary in cross section between the bottom surface of said groove and the axially open side thereof, said spaces being narrower at the bottom and wider at the top, and bonding material disposed in said spaces for securing said insert to the sides of said groove.

2. The combination set forth in claim 1, wherein the two opposite sides of said body groove are substantially parallel and the sides of said insert are tapering to provide a variable spacing between the axially open side and the bottom surface of the groove to form side spaces of variable width in conjunction with the adjacent sides of said insert.

3. The combination set forth in claim 1, wherein the width of said insert varies between its bottom and its outer face to form side spaces in conjunction with the adjacent sides of said groove varying from one-half percent of the width of said groove at the bottom to one and one-half percent of the width of said groove at the axially open side thereof.

JOHN B. BAKER.

REFERENCES CITED

The following references are of record in the file of this patent:

UNITED STATES PATENTS

| Number | Name | Date |
|---|---|---|
| 2,030,576 | Erickson | Feb. 11, 1936 |
| 2,101,376 | Voigtlander | Dec. 7, 1937 |
| 2,172,545 | Praeg | Sept. 12, 1939 |
| 2,502,128 | Curtis | Mar. 28, 1950 |

FOREIGN PATENTS

| Number | Country | Date |
|---|---|---|
| 893,423 | France | Jan. 31, 1944 |